United States Patent
Hogg et al.

(10) Patent No.: US 8,104,025 B2
(45) Date of Patent: *Jan. 24, 2012

(54) EXTENSIBLE METADATA

(75) Inventors: James H. Hogg, Bellevue, WA (US);
William G. Evans, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1316 days.

This patent is subject to a terminal disclaimer.

(21) Appl. No.: 11/733,659

(22) Filed: Apr. 10, 2007

(65) Prior Publication Data

US 2007/0198972 A1 Aug. 23, 2007

Related U.S. Application Data

(63) Continuation of application No. 10/608,986, filed on Jun. 26, 2003, now Pat. No. 7,219,330.

(51) Int. Cl.
*G06F 9/45* (2006.01)
(52) U.S. Cl. .......................... 717/140; 717/106
(58) Field of Classification Search ..................... None
See application file for complete search history.

(56) References Cited

U.S. PATENT DOCUMENTS

| | | | |
|---|---|---|---|
| 6,044,217 A | 3/2000 | Brealey et al. | |
| 7,219,338 B2 * | 5/2007 | Venter | 717/140 |
| 7,289,997 B1 * | 10/2007 | Kita et al. | 1/1 |
| 7,322,022 B2 * | 1/2008 | Al-Azzawe et al. | 717/106 |
| 7,624,397 B1 * | 11/2009 | Washburn et al. | 719/315 |
| 7,743,363 B2 | 6/2010 | Brumme et al. | |
| 2003/0172368 A1 | 9/2003 | Alumbaugh et al. | |
| 2004/0031023 A1 * | 2/2004 | Li | 717/140 |
| 2004/0187090 A1 | 9/2004 | Meacham | |
| 2004/0236093 A1 | 11/2004 | Schwartz | |
| 2004/0255268 A1 * | 12/2004 | Meijer et al. | 717/106 |

OTHER PUBLICATIONS

Piessens et al, Support for Metadata-driven Selection of Run-Time Services in .NET is Promising but Immature, Journal of Object Technology, vol. 3 No. 2, pp. 27-35, 2004, Retrieved on [Oct. 27, 2011] Retrieved from the Internet: URL<http://www.jot.fm/issues/issue_2004_02/article3.pdf>.*

Vogels, Werner, HPC.NET—Are CLI-based Virtual Machines Suitable for High Performance Computing, SC'03, Nov. 2003, pp. 1-11, Retrieved on [Oct. 27, 2011] Retrieved from the Internet: URL<http://www.supercomp.org/sc2003/archive/sc2003final/paperpdfs/pap251.pdf>.*

* cited by examiner

*Primary Examiner* — Thuy Dao
*Assistant Examiner* — Cheneca Smith
(74) *Attorney, Agent, or Firm* — Lee & Hayes, PLLC

(57) ABSTRACT

Systems and methods for extensible metadata are described. In one aspect, source code is compiled to generate an assembly. During assembly generating operations, metadata and extensible metadata is emitted into the assembly. The extensible metadata describes standard and non-standard metadata that presents an extension to the standard metadata.

20 Claims, 3 Drawing Sheets

EXTENSIBLE METADATA

RELATED APPLICATION

This patent application is a continuation of U.S. patent application Ser. No. 10/608,986, filed on Jun. 26, 2003, titled "Extensible Metadata", and hereby incorporated by reference.

BACKGROUND

Metadata is information describing a computer program that is stored either in a common language runtime portable executable (PE) or in memory. When program code, type information and data is compiled into a PE file (i.e., an assembly), metadata is inserted into one portion of the file, whilst code is converted into an intermediate language (IL) and inserted into another portion of the file. Every type, all type members—fields, methods, properties and events, are defined and referenced in a module or assembly is described within metadata. For instance, assembly metadata includes information to describe assembly identity (name, version, culture, public key, etc.), types (name, visibility, base class), exported types, descriptive elements that modify types and members, referenced assemblies, security permissions needed to run, interfaces implemented, and so on.

A metadata consumer (e.g., a browser, linker, compiler, runtime, integrated development environment (IDE), etc.) performs its respective functions by loading metadata into memory to discover information about the consumer code's types, members, inheritance, etc. Different consumers may use different metadata or share the same metadata for various purposes. Anyone building such a consumer must read and incorporate details of metadata layout, the structure of which is fixed/"hardwired" and enforced with a standardized schema, and semantics or meaning of the metadata to use the metadata. For instance, versions 1 and 1.1 of the Common Language Runtime (CLR) hard-wire metadata content and structure stored in assemblies—that's to say, each assembly uses the same schema as documented in the well known ECMA-335-II document. Anyone building software that attempts to understand an assembly has no choice but to read and digest the details of layout and meaning defined in that document. Put another way, the metadata is not self-describing.

Entities such as computer programmers, business development, and so on, often strive to create new useful products and to improve existing products, for instance, by adding features to computer languages, the CLR, and/or other software tools, to add a new table to change capabilities of a metadata consumer, etc. Such product development/enhancement typically requires changes, or extensions to the kinds of metadata that are stored in existing assemblies. (Use of "custom attributes" and/or "custom modifiers" associated with already standardized data is not considered a metadata extension, but rather a "decoration" of already standardized data). However, since the layout of consumer metadata is hardwired with a fixed representation, such extensions will be incompatible and almost guaranteed breaking to most existing metadata consumers (i.e., applications that attempt to import the extended metadata used to support the new feature(s)). Execution of an unmodified consumer of the metadata may result in undesirable consequences such as application and/or system crashes or lock-ups, data corruption, etc. An unmodified consumer is a metadata "importer" (e.g., a compiler/tool/ common language interface (CLI), and/or the like) that has not been rewritten and recompiled to account for the newly added metadata.

For example, in view of a metadata extension, an unmodified metadata consumer might react as follows:

Not detect the presence of the extension (new information). This may or may not result in benign behavior. For instance, a class browser that does not report that a particular method has a constant for a first parameter (i.e., as indicated by extended metadata) may not result in a browser crash or lockup. However, another CLI that cannot parse new metadata indicating that a particular method is aliased (redirected) to another method may result in substantially (or, indeed, catastrophic) undesirable runtime behavior.

Detect presence of the extension and gracefully report an invalid assembly.

Detect presence of the extension and crash (e.g., crash at the point of detection, or sometime later) due to poor validation within the importer.

Etc.

To avoid undesirable runtime failures in view of newly added metadata extension(s), each and every importer of the extension typically needs to be rewritten and recompiled to successfully parse the extension. Requiring computer programmers to rewrite and recompile metadata consumer(s) can be substantially time consuming, error prone, and labor intensive. To make matters worse, incompatible metadata consumer-breaking behavior may occur with respect to every new feature added to metadata. This problem becomes even larger when the metadata extension is to be shared across multiple different types of metadata consumers.

Accordingly, conventional systems and techniques make it substantially difficult to extend metadata to support new metadata consumer functionality without engaging in potentially time consuming, labor intensive, error-prone, and costly efforts to rewrite and recompile each and every metadata consumer that may use the modified metadata.

SUMMARY

Systems and methods for extensible metadata are described. In one aspect, source code is compiled to generate an assembly. Whilst converting a program written in an assembly-level or higher-level language, metadata and extensible metadata is emitted into the assembly. The extensible metadata describes standard, plus non-standard metadata that presents an extension to the standard metadata.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

The following detailed description references the accompanying figures. In the figures, the left-most digit of a component reference number identifies the particular figure in which the component first appears.

DETAILED DESCRIPTION

Overview

Figure 1:
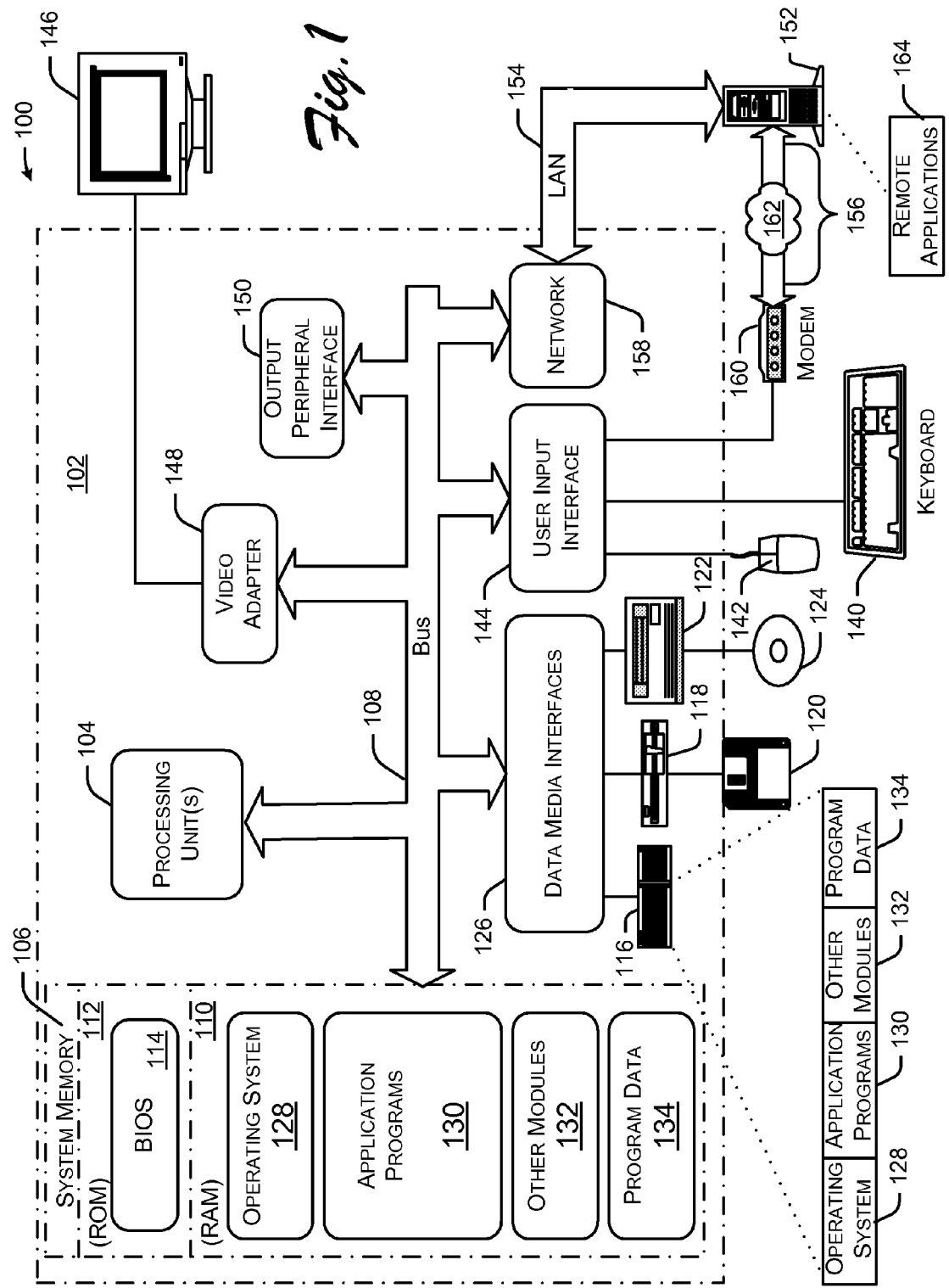
FIG. 1 is a block diagram of an exemplary computing environment within which systems and methods for extensible metadata may be implemented.

Systems and methods for emitting and consuming extensible (i.e., non-standard) metadata from an assembly are described. Extensible metadata describes metadata features, constructs, and/or extensions to one or more source languages that cannot be stored or handled by standard metadata. Additionally, extensible metadata is self-describing with respect to its layout/representation, content, and applicability to a metadata consumer. This self-describing aspect of extensible metadata allows a metadata consumer (a metadata "importer") to discover the presence, properties, and representation of the extensible metadata, as well as a suggestion of whether the importer needs to understand and incorporate semantics of the extensible metadata for proper importer functionality.

In view of the above, when a metadata consumer encounters unanticipated metadata (i.e., a non-standard metadata), the consumer can selectively implement subjectively-correct behavior by utilizing the self-describing aspect of the extensible metadata to intelligently parse the extension's layout, class information, and so on. If the extension is not understood, the consumer can selectively choose to display an error message, gracefully exit, and/or perform some other operation/response. This allows entities such as computer programmers to add a new feature to a metadata consumer (e.g., linkers, browsers, compilers, runtimes, interfaces, IDEs, etc.), wherein the new feature has a previously unanticipated layout or property, without breaking previously-shipped versions of the metadata consumer. Moreover, the new feature can be added independent of potentially labor-intensive, and costly rewriting/re-compiling of the metadata consumer to parse a metadata extension associated with the new feature.

Exemplary Operating Environment

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

FIG. 1 illustrates an example of a suitable computing environment 100 on which the subsequently described systems, apparatuses and methods for EM may be implemented (either fully or partially). Exemplary computing environment 100 is only one example of a suitable computing environment and is not intended to suggest any limitation as to the scope of use or functionality of systems and methods the described herein. Neither should computing environment 100 be interpreted as having any dependency or requirement relating to any one or combination of components illustrated in computing environment 100.

The methods and systems described herein are operational with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, internet-aware watches, embedded controllers in vehicles or manufacturing equipment, or other computing devices. The invention may also be practiced in distributed computing environments where tasks are performed by remote processing devices that are linked through a communications network. In a distributed computing environment, program modules may be located in both local and remote memory storage devices.

As shown in FIG. 1, computing environment 100 includes a general-purpose computing device in the form of a computer 102. The components of computer 102 can include, by are not limited to, one or more processors or processing units 104, a system memory 106, and a bus 108 that couples various system components including system memory 106 to processor 104. The system bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 102 typically includes a variety of computer-readable media. Such media may be any available media that is accessible by computer 102, and it includes both volatile and non-volatile media, removable and non-removable media. In FIG. 1, system memory 106 includes computer-readable media in the form of volatile memory, such as random access memory (RAM) 110, and/or non-volatile memory, such as read only memory (ROM) 112. A basic input/output system (BIOS) 114, containing the basic routines that help to transfer information between elements within computer 102, such as during start-up, is stored in ROM 112. RAM 110 typically contains data and/or program modules that are immediately accessible to and/or presently being operated on by processor 104.

Computer 102 may further include other removable/non-removable, volatile/non-volatile computer storage media. For example, FIG. 1 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM/R/RW, DVD-ROM/R/RW/+R/RAM or other optical media. Hard disk drive 116, magnetic disk drive 118 and optical disk drive 122 are each connected to bus 108 by one or more interfaces 126.

The drives and associated computer-readable media provide non-volatile storage of computer readable instructions, data structures, program modules, and other data for computer 102. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A user may provide commands and information into computer 102 through input devices such as keyboard 140 and pointing device 142 (such as a "mouse"). Other input devices (not shown) may include a microphone, joystick, game pad, satellite dish, serial port, scanner, camera, etc. These and other input devices are connected to the processing unit 104 through a user input interface 144 that is coupled to bus 108, but may be connected by other interface and bus structures, such as a parallel port, game port, or a universal serial bus (USB).

A monitor 146 or other type of display device is also connected to bus 108 via an interface, such as a video adapter 148. In addition to monitor 146, personal computers typically include other peripheral output devices (not shown), such as speakers and printers, which may be connected through output peripheral interface 150.

Computer 102 may operate in a networked environment using connections to one or more remote computers, such as a remote computer 152. Remote computer 152 may include many or all of the elements and features described herein relative to computer 102. Connections shown in FIG. 1 are a local area network (LAN) 154 and a general wide area network (WAN) 156. Such networking environments are commonplace in offices, enterprise-wide computer networks, intranets, and the Internet.

When used in a LAN networking environment, computer 102 is connected to LAN 154 via network interface or adapter 158. When used in a WAN networking environment, the computer typically includes a modem 160 or other means (e.g., wireless communications) for establishing communications over WAN 156. Modem 160, which may be internal or external, may be connected to system bus 108 via the user input interface 144 or other appropriate mechanism. Depicted in FIG. 1, is a specific implementation of a WAN via the Internet. Here, computer 102 employs modem 160 to establish communications with at least one remote computer 152 via the Internet 162.

In a networked environment, program modules depicted relative to computer 102, or portions thereof, may be stored in a remote memory storage device. Thus, e.g., as depicted in FIG. 1, remote application programs 164 may reside on a memory device of remote computer 152. It will be appreciated that the network connections shown and described are exemplary and other means of establishing a communications link between the computers may be used.

A number of program modules may be stored on the hard disk, magnetic disk 120, optical disk 124, ROM 112, or RAM 110, including, e.g., an operating system (OS) 128 to provide a run-time environment, application programs 130 for EM, other program modules 132 (e.g., device drivers, etc.), and program data 134 such as source code, intermediate assemblies, and/or the like.

Figure 2:
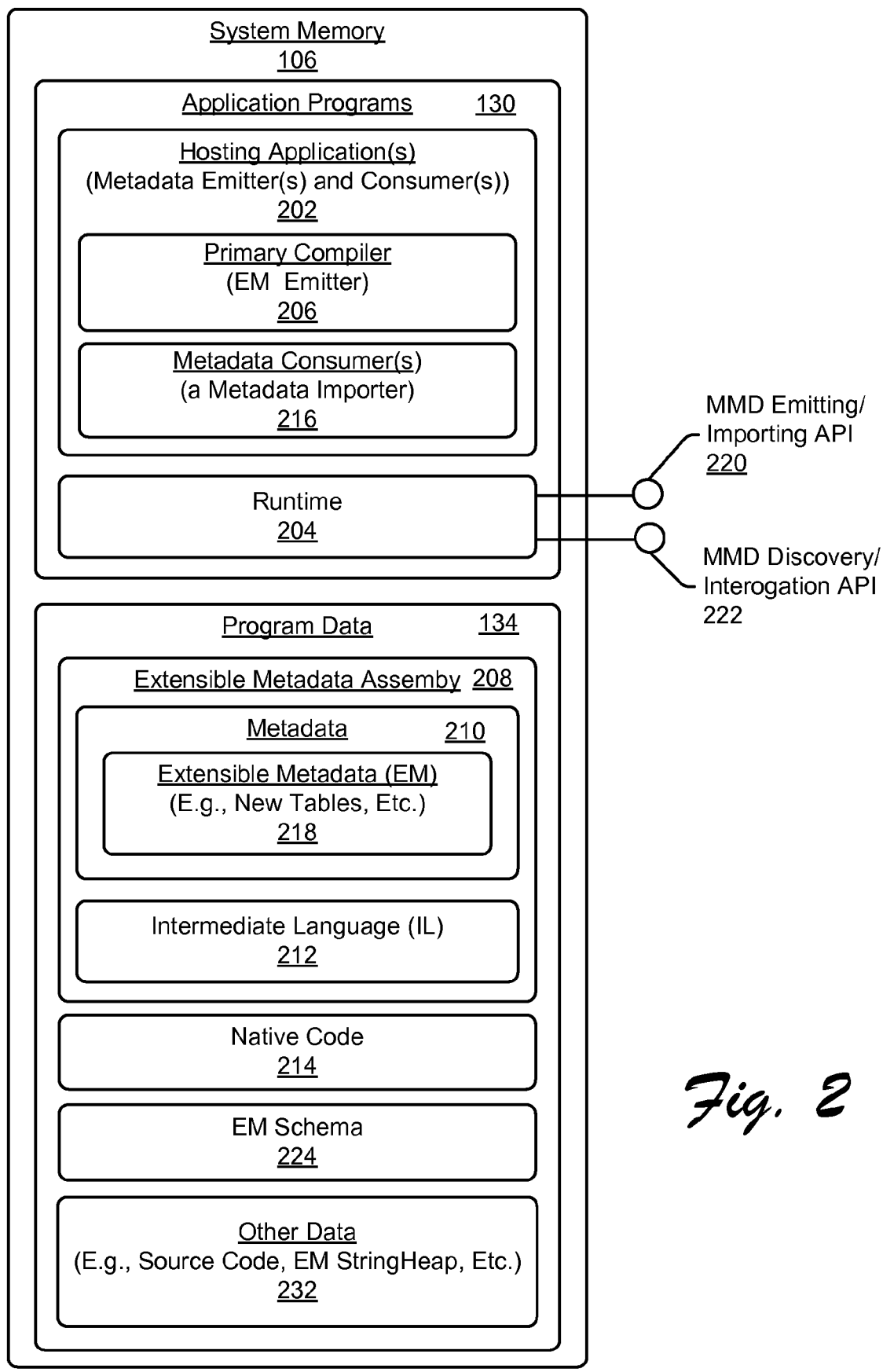
FIG. 2 is a block diagram that shows further exemplary aspects of system memory of FIG. 1, including application programs and program data used for extensible metadata.

FIG. 2 is a block diagram that shows further exemplary aspects of system memory 106 of FIG. 1, including application programs 130 and program data 134 for implementing EM. Application programs 130 include, for example hosting applications 202 and a runtime 204. Hosting applications 202 utilize one or more runtime 204 provided services such as compiler, debugging, memory and exception management, profiling, security, etc., services. Thus, hosting applications 202 are said to "host" the runtime 204. Hosting applications 202 include a primary compiler 206 to compile source code (see, the "other data" 232 portion of the program data) into an extensible metadata (EM) assembly 208. The primary compiler 206 can be any type of computer-programming language compiler such as a C, C++, C#, Visual Basic, Eiffel, COBOL, FORTRAN, Perl, and/or other type of compiler.

EM assembly 208 includes metadata 210 and platform/processor-independent intermediate language (IL) instructions 212. As such, the EM assembly 208 represents an intermediate stage in the conversion of the source code into platform specific native code 214 for execution by a metadata consumer 216 (e.g., a browser, linker, compiler, and/or other computer program that imports the metadata 210 portion of an EM assembly 208; as well as execution of the native code by the processing unit(s) 104 of FIG. 1). In contrast to conventional metadata, metadata 210 includes EM 218. EM 218 is self-describing in that it indicates its presence, properties, layout, content, and so on, to a interrogating metadata consumer 216. All EM 218 is substantially uniquely "tagged", or differentiated from all "non-EM" to allow a metadata importer (i.e., a consumer 216) to discover the EM. Non-EM is standard metadata, which may also be represented in the metadata 210 portion of the EM assembly 208. Each EM 218 extension includes "suggested action" information. The suggested action information guides the metadata importer as to whether it must understand one or more features associated with the imported EM 218 to properly function. Or whether the importer may safely ignore the feature with assurance that nothing catastrophic/undesirable will result during runtime operations if the feature is ignored. The guiding information is defined by the designer(s) of each "EM emitter". An EM emitter is an entity that generates the EM 218.

In one implementation, the EM emitter is any computer-program application that has been designed to emit EM, such as a software tool that converts a Type Library, or XML type definition file, into a CLR assembly. In this implementation, the EM emitter is the primary compiler 206. During source code compiling operations, the primary compiler 206 emits EM 218 into the assembly 208 by interfacing with an EM emitting Application Programming Interface (API) 220. The API 220 is exposed by the runtime 204 as unmanaged code and does not run under the control of the runtime 204.

After assembly 208 has been generated by an EM emitter, the assembly 204 is available for loading and execution by one or more metadata consumers 216. Since a runtime 204 is being utilized in this implementation (the use of a runtime and all associated runtime interfaces is optional to generation and use of EM 218), a metadata consumer utilizes a Just-In-Time (JIT) compiler component (not shown) of the runtime 204 to covert the loaded assembly into native code 214. During this process, the consumer 216 calls EM discovery API 222 to discover any EM 218 that may be associated with the loaded native code 214. Upon identifying EM 218, the consumer further interfaces with the API 222 to interrogate and subsequently evaluate properties and/or suggested guideline use of the discovered EM 218.

For example, an importer 216 calls EnumTypeDefs (an API 222) to retrieve details of all types defined in the current assembly 208. In contrast to existing techniques, the importer must check whether the information returned is tagged "extension". If so, the importer must query for more information before proceeding—for this, it will use the new method GetFeatureUsed of the API 222 to obtain a list of the features used by the assembly. (In this implementation, the API 222 is managed code that is exposed and runs under control of the runtime 204. In an alternative implementation, a method (e.g., EnumGenericTypeDefs) is used to retrieve only those type definitions that rely upon a particular feature, for example, the known "Generics" feature. In this alternative implementation, multiple different species of EnumXXXTypeDefs are used by the importer to discover anything and/or everything in the metadata 210.

Exemplary Extensible Metadata

We now describe exemplary aspects of the EM 218, which includes:

An EM Schema 224 ("schema 224") to enforce data format and properties (e.g., relationships to other tables, etc.) when adding a new EM table 218 to an EM assembly 208;

A MetaStringHeap ("meta-string-heap as shown in the "other data" 226 of the program data) to store character strings associated with EM 218; and The following EM 218 tables:

MetaTables—records which metadata tables are stored in the current assembly

MetaHeapDef—records which metadata heaps are stored in the current assembly

MetaColDef—records, for each metadata table in the current assembly, details of its columns: their name, width and kind MetaToks—records details of the various metadata tokens used in the current assembly: their number, kind, and which metadata table or heap they refer to MetaCodedToks—records details of the various coded tokens used in the current assembly; in particular, to how many different metadata tables the code token can refer MetaCodedVals—provides additional information to the MetaCodedToks table, by recording precisely which metadata tables each coded token may refer to MetaFeature table—names each feature used in the current assembly; records its globally unique ID, or GUID; and says which feature number will be used in the current assembly for this feature; and UseFeature—a table designed to hold information about every table in the EM 218 and further provide suggested metadata consumer 216 use guidelines.

MetaSchema

In this implementation, EM schema 224, or MetaSchema table is stored in a new metadata stream called #Schema that is different from other runtime streams (e.g., #Strings, #US, #Blob-"Binary Large Object", #GUID, and #~). The MetaSchema table 224 has the following features.

Version: uint16 Major, Minor: The version of EM stored in this assembly 208. For instance, a first release will use the values 1, 0. The version number might be bumped in future, not to add new features, but the opposite—for example, perhaps in the future, a feature such as Generics (see below) will have been universally adopted and made its way into the runtime 204: at that point, we might revise so that what used to be EM 218 becomes regular.

NumTables: uint16: The number of tables in this particular assembly 208. Each table in the metadata 210 is assigned a number. For example, tables 0x0000 thru 0x0029 can be reserved standard metadata (i.e., as defined in ECMA-335-II). Whereas, in contrast to such standard metadata, table numbers 0x0030 thru 0xFF00 can be defined to any purpose. Not all tables need be present; thus, NumTables is the number of tables present, not the highest table number present. (Numbers 0xFF01 thru 0xFFFF are reserved).

NumHeaps: uint16: The number of heaps in this particular assembly 208. Each heap is assigned a number. Heaps 0x0000 (String), 0x0001 (UserString), 0x0002 (Blob) and 0x0003 (GUID) are reserved as defined in ECMA-335-II. In contrast, numbers 0x0004 thru 0xFFFF can be defined to any purpose. Not all heaps need be present; thus, NumHeaps is the number of tables present, not the highest heap number present. (In this implementation, numbers 0xFF01 thru 0xFFFF are reserved for possible future extensions to EM).

MetaStringWidth: uint16: The width-in-bytes of the number required to index the last string stored in the MetaStringHeap (see below). I.e., 1, 2, 4 or 8. A width of 1, or sometimes 2, bytes should be adequate—able to index a MetaStringHeap of up to 64K bytes. But MetaStringWidth is included for extensibility to expand to very large MetaStringHeaps.

MetaStringHeap

EM 218 includes a new MetaStringHeap. It is modeled on the regular metadata String heap, storing identifier names as null-terminated UTF8 strings. It is stored in a new metadata stream called #MetaString. The MetaStringHeap is used to store meta-identifiers—the name of a table (eg: "NestedClassTable"), of a heap (eg: "UserStringHeap"), the 'friendly' name of a feature (eg: "Generics") and so on. These are in contrast to the names stored in regular metadata heaps—for example, the identifiers (names of classes, fields, methods, events, etc) for a user program.

It is suggested that the MetaStringHeap employ string interning, but this is not mandated. Any consumer 216 that builds dependencies upon whether a particular implementation of the MetaStringHeap interns strings is not portable.

Here is an example of the start of a MetaStringHeap. The first string is the null string " " at the byte offset 0x00, followed by "TypeDef" at byte offset 0x01, and so on. The terminating null is represented by the single "◊" glyph.

| Byte-Offset | UTF8 String |
| --- | --- |
| 0000 | ◊ |
| 0001 | TypeDef◊ |
| 0009 | Module◊ |
| 0010 | MemberRef◊ |

MetaTables

The new EM 218 EM MetaTables has the following column layout:

Num: uint16: The table number this row describes.

Name: uint16: Byte offset into the MetaStringHeap, to the start of the name for this table. For example "TypeDef". The names for "fixed" tables match those in ECMA-335-II. The names for extension tables re arbitrary, and need not even be unique.

Flags: uint16: A flags bitmask. Exemplary values are defined as follows:

0x0001=>the corresponding table is an extension table—one that extends beyond the standard ECMA-335 specification. The feature, or features, that such an extension table supports can be found in the Feature meta-meta table.

0x0002=>the corresponding table is sorted, by primary key, in ascending order. The column that holds the primary key is given by the SortCol entry 0x0004=>the corresponding table is sorted, by primary key, in descending order. The column that holds the primary key is given by the SortCol entry NumCols: uint16: The number of columns in this table. The details of each column's type and size are stored in the MetaColDef table (see below).

Pattern: uint16: Defines the "pattern" of table use, based upon the patterns found useful for various scenarios to-date. In this implementation, the following values are defined:

0x0001: Normal. A simple table such as TypeDef, MemberRef, File and so on.

0x0002: OneToOne. Such a table represents a row-for-row logical extension to another table. The Relates columns says which table. (Eg: The FieldPtr table is a OneToOne extension of the Field table—these two have exactly the same number of rows)

whilst another assembly 208 might number that same feature as a different number. This does not matter—in each case, the Feature table maps the number to the same feature via its GUID (e.g., awarded by the vendor who first published the feature)

TotalSize: uint16: Total size, in bytes, of this table, in this assembly 208.

The following is the entire MetaTableDef for all 'known' metadata: it includes ECMA-335, descriptions for #-format tables (as produced by "out-of-order" compilers; also known as uncompressed metadata 210), and three (3) new EM 218 tables introduced by Generics. (Items in italics are not stored as-is—they are simply helpful annotations for the reader). (Although not shown, a TotalSize column is also present in the following table).

| Num | Name | Flags | Num Cols | Pattern | Relates | SortCol | Feature |
|---|---|---|---|---|---|---|---|
| 0000 | xxxx Mod | 0000 | 0005 | 0001 Normal | FFFF None | FFFF None | FFFF None |
| 0001 | xxxx TypeRef | 0000 | 0003 | 0001 Normal | FFFF None | FFFF None | FFFF None |
| 0002 | xxxx TypeDef | 0000 | 0006 | 0001 Normal | FFFF None | FFFF None | FFFF None |
| 0003 | xxxx FieldPtr | 0001 | 0001 | 0002 OneToOne | 0003 Field | FFFF None | 0001 Uncomp |
| 0004 | xxxx Field | 0000 | 0003 | 0001 Normal | FFFF None | FFFF None | FFFF None |
| 0005 | xxxx MethPtr | 0001 | 0001 | 0002 OneToOne | 0006 Meth | FFFF None | 0001 Uncomp |
| 0006 | xxxx Meth | 0000 | 0006 | 0001 Normal | FFFF None | FFFF None | FFFF None |
| 0007 | xxxx ParamPtr | 0001 | 0001 | 0002 OneToOne | 0008 Param | FFFF None | 0001 Uncomp |
| 0008 | xxxx Param | 0000 | 0003 | 0001 Normal | FFFF None | FFFF None | FFFF None |
| 0009 | xxxx IFaceImpl | 0000 | 0002 | 0001 Normal | FFFF None | 0000 Class | FFFF None |
| 000A | xxxx MembRef | 0000 | 0003 | 0001 Normal | FFFF None | FFFF None | FFFF None |
| 000B | xxxx Const | 0000 | 0003 | 0001 Normal | FFFF None | 0001 Parent | FFFF None |
| 000C | xxxx CustAttrib | 0000 | 0003 | 0001 Normal | FFFF None | 0000 Parent | FFFF None |
| 000D | xxxx FieldMarshal | 0000 | 0002 | 0001 Normal | FFFF None | 0000 Parent | FFFF None |
| 000E | xxxx DeclSec | 0000 | 0003 | 0001 Normal | FFFF None | 0001 Parent | FFFF None |
| 000F | xxxx ClassLayout | 0000 | 0003 | 0001 Normal | FFFF None | 0002 Parent | FFFF None |
| 0010 | xxxx FieldLayout | 0000 | 0002 | 0001 Normal | FFFF None | 0001 Field | FFFF None |
| 0011 | xxxx StandAloneSig | 0000 | 0001 | 0001 Normal | FFFF None | FFFF None | FFFF None |
| 0012 | xxxx EventMap | 0000 | 0002 | 0001 Normal | FFFF None | FFFF None | FFFF None |
| 0013 | xxxx EventPtr | 0001 | 0001 | 0002 OneToOne | 0014 Event | FFFF None | 0001 Uncomp |
| 0014 | xxxx Event | 0000 | 0003 | 0001 Normal | FFFF None | FFFF None | FFFF None |
| 0015 | xxxx PropMap | 0000 | 0002 | 0001 Normal | FFFF None | FFFF None | FFFF None |
| 0016 | xxxx PropPtr | 0001 | 0001 | 0002 OneToOne | 0017 Prop | FFFF None | 0001 Uncomp |
| 0017 | xxxx Prop | 0000 | 0003 | 0001 Normal | FFFF None | FFFF None | FFFF None |
| 0018 | xxxx MethSem | 0000 | 0003 | 0001 Normal | FFFF None | 0001 Meth | FFFF None |
| 0019 | xxxx MethImpl | 0000 | 0003 | 0001 Normal | FFFF None | 0000 Class | FFFF None |
| 001A | xxxx ModRef | 0000 | 0001 | 0001 Normal | FFFF None | FFFF None | FFFF None |
| 001B | xxxx TypeSpec | 0000 | 0001 | 0001 Normal | FFFF None | FFFF None | FFFF None |
| 001C | xxxx ImplMap | 0000 | 0004 | 0001 Normal | FFFF None | 0001 Forw | FFFF None |
| 001D | xxxx FieldRVA | 0000 | 0002 | 0001 Normal | FFFF None | 0001 Field | FFFF None |
| 0020 | xxxx Assem | 0000 | 0006 | 0001 Normal | FFFF None | FFFF None | FFFF None |
| 0021 | xxxx AssemProc | 0000 | 0001 | 0001 Normal | FFFF None | FFFF None | FFFF None |
| 0022 | xxxx AssemOS | 0000 | 0003 | 0001 Normal | FFFF None | FFFF None | FFFF None |
| 0023 | xxxx AssemRef | 0000 | 0009 | 0001 Normal | FFFF None | FFFF None | FFFF None |
| 0024 | xxxx AssemRefProc | 0000 | 0002 | 0001 Normal | FFFF None | FFFF None | FFFF None |
| 0025 | xxxx AssemRefOS | 0000 | 0004 | 0001 Normal | FFFF None | FFFF None | FFFF None |
| 0026 | Xxxx File | 0000 | 0003 | 0001 Normal | FFFF None | FFFF None | FFFF None |
| 0027 | xxxx ExpType | 0000 | 0005 | 0001 Normal | FFFF None | FFFF None | FFFF None |
| 0028 | xxxx ManRes | 0000 | 0004 | 0001 Normal | FFFF None | FFFF None | FFFF None |
| 0029 | xxxx NestClass | 0000 | 0002 | 0001 Normal | FFFF None | 0000 Nested | FFFF None |
| 0030 | xxxx GenPar | 0001 | 0006 | 0001 Normal | FFFF None | 0001 Owner | 0002 Generics |
| 0031 | xxxx MethSpec | 0001 | 0002 | 0001 Normal | FFFF None | FFFF None | 0002 Generics |

Relates: unit16: The table or heap number this table relates to. E.g.: The FieldPtr table relates to the Field table.

SortCol: uint16: The column number that is sorted. If the table is not sorted, the value stored is 0xFFFF, which is interpreted as "not applicable".

Feature: uint16: The feature number that this extension table supports. If the table is one of those whose definition was included in ECMA-335, then the value is 0xFFFF, to be interpreted as "no further information specified or required". Note that one assembly 208 might number feature "XYZ" as a particular number, MetaHeapDef The new EM 218 EM MetaHeapDef table has the following column layout:

Num: uint16: The heap number this row describes. Starts with 0. Defines the order in which the heaps, if present, are stored within the assembly 208.

Name: uint16: Byte offset into the MetaStringHeap, to the start of the name for this heap.

Pattern: uint16: An enum value that defines the structure of this heap. The only values defined are:

0x0001=>heap of null-terminated UTF8 strings.
0x0002=>heap of counted Unicode strings.
0x0003=>heap of length-counted binary blobs. The ECMA-335 stores signatures (field, method, localvar) and custom attribute 'objects' into that heap. Although, structure of these blobs can be identified within EM (each is defined by a BNF grammar), in this implementation, such structural identification is performed "out-of-band".
BaseSize: uint16: size, in bytes, of each element, where applicable (for Pattern="FixedElem")
Feature: uint16: The feature number that this heap supports. Because all four heaps are defined in ECMA-335, all entries are 0xFFFF, meaning "no more info", or "defined in the base set of features".
TotalSize: uint16: Total size, in bytes, of this heap, in this assembly 208.

The following is an exemplary MetaHeapDef for metadata 210 heaps. (Items in italics are not stored as-is—they are simply helpful annotations for the reader).

| Num  | Name        | Pattern         | BaseSize | Feature   | TotalSize |
|------|-------------|-----------------|----------|-----------|-----------|
| 0000 | xxxx String | 0001 UTF8       | FFFF None| FFFF None | xxxx      |
| 0001 | xxxx UserString | 0002 Unicode | FFFF None| FFFF None | xxxx      |
| 0002 | xxxx Blob   | 0003 Binary     | FFFF None| FFFF None | xxxx      |
| 0003 | xxxx Guid   | 0004 FixedElem  | 0008     | FFFF None | xxxx      |

MetaColDef

EM 218 includes a new EM MetaColDef with the following layout, including layouts for "extension" features—the FieldPtr table for uncompressed metadata. Note that assemblies 208 need only include details for those tables present—there is no need to include the definition of all possible metadata 210 tables in all assemblies 208.

| TableNum    | ColNum | Name          | Width | Kind              |
|-------------|--------|---------------|-------|-------------------|
| 0000 Mod    | 0000   | xxxx Gen      | 0002  | FFFF None         |
| 0000 Mod    | 0001   | xxxx Name     | 0004  | 0070 String       |
| 0000 Mod    | 0002   | xxxx Guid     | 0002  | 0072 Guid         |
| 0000 Mod    | 0003   | xxxx EncID    | 0002  | 0072 Guid         |
| 0000 Mod    | 0004   | xxxx EndBaseId| 0002  | 0072 Guid         |
| 0001 TypeRef| 0000   | xxxx ResScope | 0002  | 0100 ResScope     |
| 0001 TypeRef| 0001   | xxxx Name     | 0004  | 0070 String       |
| 0001 TypeRef| 0002   | xxxx Namespace| 0004  | 0070 String       |
| 0002 TypeDef| 0000   | xxxx Flags    | 0004  | 0101 TypeAttrib   |
| 0002 TypeDef| 0001   | xxxx Name     | 0004  | 0070 String       |
| 0002 TypeDef| 0002   | xxxx Namespace| 0004  | 0070 String       |
| 0002 TypeDef| 0003   | xxxx Extends  | 0002  | 0102 TypeDefOrRef |
| 0002 TypeDef| 0004   | xxxx FieldList| 0002  | 0004 Field        |
| 0002 TypeDef| 0005   | xxxx MethList | 0002  | 0006 Meth         |
| 0003 FieldPtr| 0000  | xxxx Field    | 0002  | 0004 Field        |
| 0004 Field  | 0000   | xxxx Flags    | 0002  | 0103 FieldAttribs |
| 0004 Field  | 0001   | xxxx Name     | 0004  | 0070 String       |
| 0004 Field  | 0002   | xxxx Sign     | 0002  | 0073 Blob         |
| 0006 Meth   | 0000   | xxxx RVA      | 0004  | FFFF None         |
| 0006 Meth   | 0001   | xxxx ImplFlags| 0002  | 0104 MethImplAttribs |
| 0006 Meth   | 0002   | xxxx Flags    | 0002  | 0105 MethAttribs  |
| 0006 Meth   | 0003   | xxxx Name     | 0004  | 0070 String       |
| 0006 Meth   | 0004   | xxxx Sig      | 0002  | 0073 Blob         |
| 0006 Meth   | 0005   | xxxx ParList  | 0002  | 0008 Param        |
| 0020 Assem. | 0000   | xxxx HashAlgId| 0004  | FFFF None         |
| 0020 Assem. | 0001   | xxxx Ver      | 0008  | FFFF None         |
| 0020 Assem. | 0003   | xxxx PubKey   | 0001  | 0073 Blob         |
| 0020 Assem. | 0004   | xxxx Name     | 0002  | 0070 String       |
| ...         | ...    | ...           | ...   | ...               |

MetaToks

An EM token is a 4-byte value. The top byte records its 'kind' (i.e., the table number it indexes into). The lower 3 bytes represent the row number (counted from 1) of that table. For example, the token 0x0200003C is an index into row 0x3C of the TypeDef table (whose table number is 0x02). In general, only those metadata structures indexed from the IL instruction stream are assigned a token. There is one kind of token, assigned a high byte of 0x70, that supplies a byte-offset (counted from zero) into the string heap.

The current set of tokens used is stored in the MetaToks table, thus:
Num: uint8: Token number
Flags: uint8: The following two values are defined:
  0x01: this token indexes a metadata table
  0x02: this token indexes a metadata heap
Indexes: uint16: The table number (or heap number) this token indexes into. For the currently defined tokens, the mapping from Num to Indexes is identity, but we store the mapping explicitly, looking ahead to the future where a new token value might index table with a value higher than 0xFF.

| Num | Flags | Indexes |
|-----|-------|---------|
| 00  | 01    | 0000    |
| 01  | 01    | 0001    |
| 02  | 01    | 0002    |
| 04  | 01    | 0004    |
| 06  | 01    | 0006    |
| 08  | 01    | 0008    |
| 09  | 01    | 0009    |
| 0A  | 01    | 000A    |
| 0C  | 01    | 000C    |
| 0E  | 01    | 000E    |
| 11  | 01    | 0011    |
| 14  | 01    | 0014    |
| 17  | 01    | 0017    |
| 1A  | 01    | 001A    |
| 1B  | 01    | 001B    |
| 20  | 01    | 0020    |
| 23  | 01    | 0023    |
| 26  | 01    | 0026    |
| 27  | 01    | 0027    |
| 28  | 01    | 0028    |
| 2A  | 01    | 002A    |
| 2B  | 01    | 002B    |
| 70  | 02    | 0000    |
| 72  | 02    | 0002    |

MetaCodedToks

EM 218 includes a new "CodedTokens" table. The CodedTokensble has the following exemplary layout:
Num: uint16: the number (tokenized representation) assigned to this coded token
Name: uint16: Byte offset into the MetaStringHeap, to the start of the name for this coded token.

SetSize: uint16: Number of elements in the set (of tokens, or coded tokens) that this coded token defines.

| Num | Name | SetSize |
|---|---|---|
| 0100 | xxxx TypeDefOrRef | 3 |
| 0101 | xxxx HasConst | 3 |
| 0102 | xxxx HasCustAttrib | 21 |
| 0103 | xxxx HasFieldMarsh | 2 |
| 0104 | xxxx HasDeclSec | 3 |
| 0105 | xxxx MembRefParent | 5 |
| 0106 | xxxx HasSemantic | 2 |
| 0107 | xxxx MethDefOrRef | 2 |
| 0108 | xxxx MembForw | 2 |
| 0109 | xxxx Impl | 3 |
| 010A | xxxx CustAttribType | 5 |
| 010B | xxxx ResScope | 4 |
| 010C | xxxx TypeMethOrDef | 2 |

Note that coded tokens are used in MetaColDef for the "kind" column. In this implementation, and for purposes of backward compatibility, values for the coded tokens are different from conventional token values, which are restricted to the values 0x00-0xFF. This is done by starting coded token values at 0x0100.

MetaCodedVals

As well as recording that 0x0101 is the tokenized representation for the coded token known as "HasConst", we record the set of tokens that it holds. And similarly for all other coded tokens. This is done in the MetaCodedVals table. Conceptually, the MetaCodedValues table is as follows:

```
0001 TypeRef
0002 TypeDef
001B TypeSpec
0004 Field
0008 Param
0017 Prop
```

The values in the MetaCodedValues table are a list of uint16s. The first entry in the MetaCodeToks table is "TypeDefOrRef" with a set size of 3—so the first 3 uint16s in the MetaCodeVals "table"—{0x0001, 0x0002, 0x001B}={TypeRef, TypeDef, TypeSpec} are the members of the TypeDefOrRef coded token. And so on, for all the remaining coded tokens. Uint16s are used rather than uint8s, to accommodate the possibility in future that a coded token might have other coded tokens in its membership.

MetaFeature

EM 218 includes a new "Features" table. It has the following exemplary layout:
Num: uint16: The feature number, as used in this assembly 208. Note that this is not absolute (although it's likely that each vendor would always use the same values). This allows different vendors to publish a feature without coordinating its number world-wide.
ID: uint16: Index into MetaGuidHeap (starting at 0, which represents the null GUID). This specifies the GUID assigned to this feature by the first vendor to publish the feature. The feature set defined in ECMA-335 is denoted by the GUID={tbd}
Name: uint16: Index into MetaStringHeap, to the start of the name for this feature. The name for the feature set defined in ECMA-335 is given the name "ECMA-335". All other names for extension features are entirely arbitrary, and need not even be unique. But the recommendation, obviously, is to choose helpful descriptions, and to be unique; if accidental clashes happen, the world does not fall apart.
Flags: uint16: A flags bitmask. There are no values defined for this bitmask. Until a revision of EM is issued, it must be 0x0000.

Here is an example of a MetaFeature table in a specific assembly 208:

| Num | ID | | Name | Flags |
|---|---|---|---|---|
| 0001 | 0001 | {6276708F-FF6E-4dfa-A2D7-D6D322C421C9} | xxxx Uncompressed Metadata | 0000 |
| 0002 | 0002 | {4C4E403A-B278-4642-BD07-8F9F7EB85B7B} | xxxx Generics | 0000 |
| 0007 | 0003 | {3D71CF53-B22A-47aa-BDB1-383F0B658A92} | xxxx ValueArrays | 0000 |
| 001F | 0007 | {707DB3D4-B829-404a-B6BE-767F74E1D0E4} | xxxx Dynamic Properties | 0000 |
| 0009 | 0009 | {B28D6E81-FB85-4695-B918-2350762A31E4} | xxxx Multiple Inheritance | 0000 |
| 0035 | 000A | {68FD0A07-A6F8-4ae8-AA39-15D16AC603E6} | xxxx Mixins | 0000 |
| 0027 | 0005 | {2DC6C452-CD3A-4380-97C0-1D7A3B163252} | xxxx Contracts | 0000 |
| 0013 | 0006 | {90B70713-A9F1-492d-97CF-A83AE249FB80} | xxxx Inner Classes | 0000 |

UsesFeature

This is a new metadata (not EM) table. It holds information about every row in every metadata table that is tagged as "extended". Its layout is:
TableNum: uint16: The table number for which this entry provides extension info.
RowNum: uint24: The row in table number TableNum for which this entry provides extension info.
FeatureNum: uint16: the feature number which caused this extension.
MustUnderstand: uint8: The low 4 bits is a bitmask: a set bit means this feature must be understood by the corresponding category of metadata importer. Exemplary bitmask values are as follows:
0b0001: Browser
0b0010: Linker
0b0100: Compiler
0b1000: CLR
For example, a MustUnderstand mask of 0b0110 indicates that only CLR and Browsers can safely ignore the information in the table row defined by TableNum+RowNum; whilst Linkers and Compilers must understand the information to work correctly. A default MustUnderstand mask, for example, 0x0000, can be used to indicate all previous version features.

It's the UsesFeature table that a metadata importer queries when it reads an item of metadata marked with the "extends" bit. For performance reasons, the UsesFeature table is sorted by TableNum+RowNum columns (eg, for fast binary chop search).

Extensible Metadata Suggested Action/Use Information

As noted above, each EM 218-provided extension further includes "suggested action" information. The suggested action information guides a metadata importer (consumer 216) as to whether it must understand the feature associated with the imported EM 218 to properly function, or whether the importer may safely ignore the feature (i.e., with an implied assurance that nothing catastrophic/undesirable will result during runtime operations if the importer ignores the feature). For purposes of discussion, software has to understand a feature if it needs to include code that explicitly checks for that feature's presence, and takes some action based on that feature. Defining such guiding information for each feature presented by new EM 218 implies careful thought by an EM emitter.

For example, in this implementation, when the EM 218 represents:

- Design-time information such as property and event information, the EM 218 may be marked as needing to be understood by browsers 216, linkers 216, and compilers 216. When the runtime 204 determines behavior from method metadata, the runtime 204, which is also a consumer of the EM 218, will not need to understand the EM 218.
- A value array (ValueArray), it should be understood by browsers 216; must be understood by the runtime 204; but is ignorable by a linker 216. In one implementation, an importing compiler (e.g., a JIT compiler provided by the runtime 204) can call methods of a type which embed a ValueArray without having to understand ValueArrays per se.
- Generics EM, a Browser might safely skip over Generics metadata and not display it to the user. But a linker and CLR must understand that metadata, else their behavior will be wrong. Importing compilers might safely ignore parts of Generics metadata—for example, that a Type implements a generic interface—but have to understand other parts, such as defining a sub-class of a generic class.

These are just examples and many additional and/or different extensions (e.g., other than a value array and/or generics) could be described by EM 218.

When it is substantially difficult to identify in advance how a particular type of consumer 216 (e.g., browser, compiler, runtime, linker, etc.) should respond to an EM 218-provided feature, the emitter marks the feature as "must understand" for each type of importer.

An Exemplary Procedure

Figure 3:
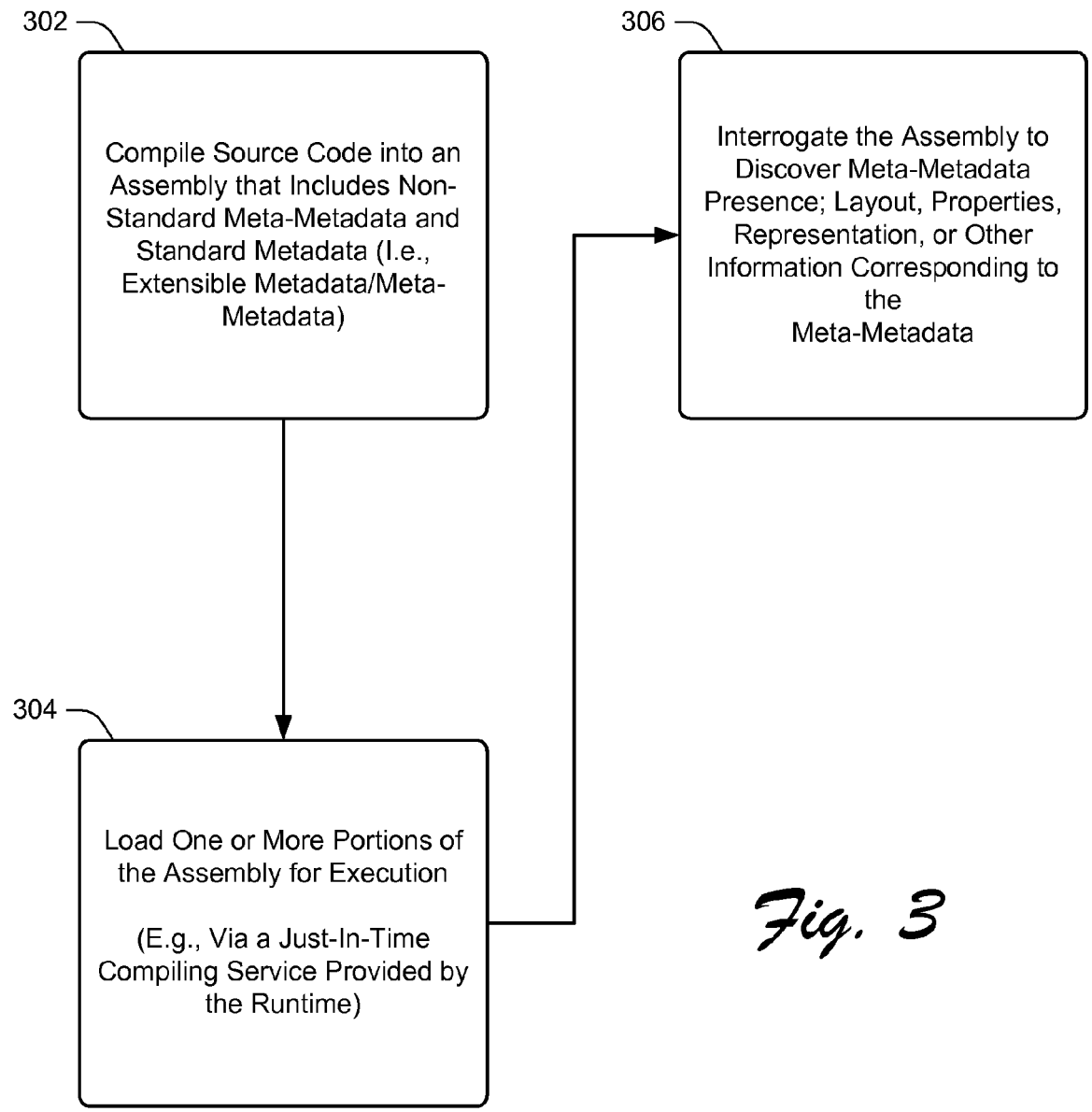
FIG. 3 shows an exemplary procedure for extensible metadata.

FIG. 3 shows an exemplary procedure 300 to generate and use extensible metadata 218. For purposes of discussion, these procedural operations are described in reference to program module and data features of FIGS. 1 and 2. In the following discussion, the left-most digit of a component reference number identifies the particular figure (Fig.) in which the component appears. At block 302, the primary compiler 206 (FIG. 2) compiles source code (see, "other data" 232) is compiled to generate an assembly 208. The primary compiler enforces data format and table relationships in the EM 218 with an EM schema 224. In particular, the EM 218 is non-standard metadata that represents an extension to standard metadata.

As described above, the emitted EM 218 is self-describing to an EM consumer 202 (including the runtime 204). The EM is tagged, or differentiated such that is can be differentiated by a metadata consumer from the standard metadata. During compilation operations, the primary compiler (the compiler that converts a source language into Intermediate Language (IL)) and generates a string heap (e.g., see "other data" 232) to store character strings associated with the EM 218. The primary compiler emits compiled source code as metadata 210, which includes standard metadata and EM 218, into the assembly 208.

At block 304, a metadata consumer 202 (e.g., a browser, a linker, a compiler, and/or a runtime) loads the assembly into memory. At block 306, the metadata consumer interrogates one or more portions of the assembly 208 to discover presence properties, and/or representation of the EM 218. This operation is completely independent of whether or not the metadata consumer was designed to parse the layout, representation, semantics, and/or use the one or more new features associated with the EM. In this implementation, the metadata consumer performs these discovery and interrogation operations by interfacing with API 222 exposed by the runtime 204. At block 308, the metadata consumer 218 uses information from the discovery and interrogation operations to determine whether it must understand the operations of the discovered EM to properly function, may safely ignore the discovered metadata, and/or perform other implementation specific actions.

We now describe several exemplary applications of the procedure 300.

In one implementation, a metadata consumer 218 such as a browser uses information from assembly 208 discovery and interrogation operations to navigate the corresponding EM 218. Responsive thereto, the browser pretty-prints at least a subset of the content described by the EM 218. The at least a subset may include metadata corresponding to a particular method, new metadata feature, and/or so on. Since the browser is designed to interface with the EM 218, the browser performs such navigating and pretty printing operations without being rewritten and recompiled (i.e., completely independent of whether the assembly 208 includes metadata extensions for features that, at the time of the browser's development, had not been defined).

In yet another example, a metadata consumer 216 is an assembly linker that uses information from assembly 208 discovery and interrogation operations to successfully link/ merge multiple different assemblies 208 together to generate a single output assembly. For purposes of discussion, such an output assembly or any other metadata consumer output is represented by respective portions of other data" 232 of FIG. 2. At this point, any metadata consumer 216 (i.e., in addition to the assembly linker) can consume the output assembly without any need to rewrite and recompile the metadata consumer to resolve any conflicting use of metadata tables or heap use by respective ones of the merged assemblies. This is the case, even when the input assemblies embed a same numbering of one or more metadata tables and/or heaps to describe totally different features or constructs, which may have been decided in isolation by their respective producers (i.e., via proprietary implementations). Even in view of such diverse assembly characteristics, a metadata consumer can parse the linked assembly (output assembly) to identify the meaning, representation, or interpretation of each such private metadata extension completely independent of whether the private metadata extension(s) had been defined at the time of the browser's development.

CONCLUSION

The described systems and methods provide for EM. Although the systems and methods have been described in language specific to structural features and methodological operations, the subject matter as defined in the appended claims is not necessarily limited to the specific features or operations described. Rather, the specific features and operations are disclosed as exemplary forms of implementing the claimed subject matter.

For example, although the EM emitter 206 of FIG. 2 is described as interfacing with APIs 220 to emit EM 218 into EM assembly 208, this description is only illustrative and other implementations could have been described. For instance, in a different implementation, the EM 206 does not utilize the exposed API 220 of the runtime 204 to emit EM 218 into the assembly 208, but rather utilizes a different API exposed by a different computer-program module, or alternatively, directly writes the EM 218 into the assembly, independent of any intermediate module and/or API.

Additionally, although metadata consumer 216 of FIG. 2 is described as interfacing with APIs 220 to discover/interrogate EM 218 portions of the EM assembly 208, this description is only illustrative and other implementations could have been described. For instance, in a different implementation, the EM 216 does not utilize the exposed API 220 of the runtime 204 to emit EM 218 into the assembly 208, but rather utilizes a different API exposed by a different computer-program module, or alternatively, directly writes and reads the EM 218 into/from the assembly independent of any intermediate module and/or API.

The invention claimed is:

1. A method implemented by a computing device for generating extensible metadata, the method comprising:
   compiling source code to generate an assembly;
   during compiling operations, emitting metadata and extensible metadata into the assembly, the extensible metadata describing standard and non-standard metadata that represents an extension to standard metadata; and
   wherein the extensible metadata is configured such that a computer-program application utilizing the extensible metadata selectively implements behavior associated with the extensible metadata by utilizing a self-describing aspect of the extensible metadata to parse the extensible metadata.

2. The method of claim 1, wherein the extensible metadata is self-describing and further describes table layout information, data type definitions, code classes, members, and/or class inheritance information for both standard and non-standard metadata.

3. The method of claim 1, wherein the extensible metadata further comprises table layout information, data type definitions, code classes, members, and/or class inheritance information.

4. The method of claim 1, wherein the extension includes design-time information, a value array, and/or generics extensible metadata.

5. The method of claim 1, wherein compiling further comprises enforcing data format and table relationships in the extensible metadata with a extensible metadata schema, the extensible metadata schema differentiating standard metadata tables from non-standard extensible metadata tables.

6. The method of claim 1, wherein compiling further comprises tagging the extensible metadata such that the extensible metadata is differentiated by a metadata consumer from the standard metadata.

7. The method of claim 1, wherein compiling further comprises generating, by a primary compiler, a string heap to store character strings associated with the extensible metadata.

8. The method of claim 1, wherein the extensible metadata comprises one or more of:
   a MetaColDef table for identifying layout of one or more tables, the MetaColDef table comprising, for each table of the tables: a tag indicating that the table is extensible metadata, a substantially unique table identifier, data type associated with each column in the table, and/or table name and width;
   a MetaToks table comprising one or more metadata tokens to index a metadata table or a metadata heap, each EM token indicating an indexed table and a row number of the indexed table;
   a MetaCodedToks comprising one or more coded tokens, and for each coded token: an assigned number, a byte offset into an extensible metadata string heap to a corresponding name, and a number of elements in a set of tokens being defined;
   a MetaCodedVals table comprising type reference, type definition, type specification, field, and property information for extensible metadata coded tokens; and
   a MetaFeatures table comprising information for one or more new features, the information for each feature comprising a feature number, a substantially unique feature ID, and a name of the feature.

9. The method of claim 1, wherein the extensible metadata comprises multiple respective rows of data, each row being tagged as extended, and wherein the extensible metadata further comprises uses feature information for each row of the multiple respective rows, the information identifying a specific table and table row, a feature number associated with an extension identified by the table row, and an indication of one or more metadata consumer types that should understand the extension to properly function.

10. The method of claim 9, wherein the one or more metadata consumer types comprise a browser, a linker, a compiler, and/or a runtime.

11. The method of claim 1, wherein the assembly is for loading into memory by a metadata consumer independent of modification of the metadata consumer such that the metadata consumer can interrogate the runtime to discover presence of the extensible metadata, properties, and/or representation of the extensible metadata.

12. A computer-readable storage medium for extensible metadata, the computer-readable storage medium comprising computer-program executable instructions executable by a processor for:
   loading, by a metadata consumer, an assembly of compiled source code written in an assembly-level language into memory, the assembly comprising metadata and extensible metadata, the extensible metadata representing non-standard metadata that represents an extension to standard metadata;
   interrogating, by the metadata consumer, a runtime to discover one or more of presence of the extensible metadata, properties, and representation of the extensible metadata; and
   wherein the extensible metadata is self-describing to the metadata consumer, the extensible metadata comprising information to describe one or more of non-standard table layout information, data type definitions, code classes, members, and class inheritance information.

13. A computer-readable storage medium as recited in claim 12, wherein the computer-program instructions for interrogating further comprise instructions for discovering data type definitions for a specific one of multiple extended features in the extensible metadata.

14. A computer-readable storage medium as recited in claim 12, wherein the computer-program instructions for interrogating further comprise instructions for determining at least one suggested action to direct the metadata consumer with respect to use of the extensible metadata.

15. A computer-readable storage medium as recited in claim 12, wherein the computer-program instructions for loading and interrogating are performed independent of modification to the metadata consumer.

16. A computer-readable storage medium as recited in claim 12, wherein the extensible metadata comprises an indication of one or more metadata consumer types that understand a respective extension in the extensible metadata to properly function.

17. A computer-readable storage medium as recited in claim 16, wherein the one or more metadata consumer types comprise a browser, a linker, a compiler, and/or a runtime.

18. A computer-readable storage medium as recited in claim 12 wherein the extensible metadata further comprises at least one table of the tables indicating a suggested action for a metadata consumer to take with respect to the new feature, the suggested action directing the metadata consumer to understand semantics of the new feature or safely ignore the new feature.

19. A computing device for extensible metadata, the computing device comprising:
  a processor; and
  a memory coupled to the processor, the memory comprising computer-program instructions executable by the processor for:
    enforcing data format and table relationships in extensible metadata with a extensible metadata schema, the extensible metadata representing non-standard metadata for at least one new feature that is not found in standard metadata, the extensible metadata schema providing information to differentiate standard metadata from non-standard extensible metadata;
  emitting the extensible metadata into an assembly; and
  wherein the extensible metadata is configured such that a computer-program application utilizing the extensible metadata selectively implements behavior associated with the extensible metadata by utilizing a self-describing aspect of the extensible metadata to parse the extensible metadata.

20. A computing device as recited in claim 19:
  wherein the extensible metadata is self-describing to a extensible metadata consumer, the extensible metadata comprising one or more of non-standard table layout information, data type definitions, code classes, members, and class inheritance information;
  wherein an extension and the extensible metadata introduces a new feature; and
  wherein the extensible metadata further comprises at least one suggested action for a metadata consumer to take with respect to the new feature, the at least one suggested action indicating the metadata consumer must understand semantics of the new feature or is allowed to safely ignore the new feature.

* * * * *